UNITED STATES PATENT OFFICE.

FREDRICK H. CRASS, OF MURFREESBORO, TENNESSEE.

PAINT.

SPECIFICATION forming part of Letters Patent No. 707,677, dated August 26, 1902.

Application filed October 10, 1901. Serial No. 78,240. (No specimens.)

*To all whom it may concern:*

Be it known that I, FREDRICK H. CRASS, a citizen of the United States, residing at and whose post-office address is Murfreesboro, in the county of Rutherford and State of Tennessee, have invented a new and useful Paint Composition, of which the following is a specification.

My invention relates to improvements in paint compositions adapted to serve as a base; and the invention consists in an admixture of carbonized raw cotton or its equivalents of carbonized-cotton fabrics mixed with coal-tar, the ingredients being prepared, treated, and compounded in the manner following: The raw cotton is first subjected to heat to the extent of complete carbonization, care being had to prevent the carbonization extending to reduction to ashes. After carbonization the material is pulverized by passing it through a fine sieve or by any suitable manipulation which eventuates in complete disintegration. The carbonized pulverulent is then mixed with and thoroughly incorporated in coal-tar in the proportions of one gallon of the coal-tar to two ounces to one pound and a half of the pulverized carbonized cotton and the mixture subjected to agitation. If the mixture is to be used for painting or coating purposes, two ounces of the carbonized cotton will be sufficient. If the compound is to be used as a heavier coating or covering for preserving roofs or other surfaces, as much as a pound and a half of the cotton material may be used, the incorporation being accomplished by thorough stirring or other competent agitation.

In the preparation of the cotton I prefer to pack it in covered metal vessels and subject it to carbonization in an oven heated to the proper degree. The product thus obtained is superior to any other known to me for the purpose intended, being of great elasticity, and owing to its glutinous properties will adhere more firmly than any other carbon ingredient which has been used in the art.

Having thus described my invention, what I claim is—

1. The composition herein described, consisting of carbonized and pulverized raw cotton, and coal-tar in the proportions substantially as specified.

2. The process of compounding a carbon-paint composition which consists in carbonizing raw cotton, then pulverizing the carbonized cotton, and then thoroughly mixing the carbonized cotton with coal-tar, in the proportions as specified.

In testimony whereof I affix my signature in presence of two witnesses.

FREDRICK H. CRASS.

Witnesses:
R. J. PATTERSON,
G. S. RIDLEY.